$$\text{US010160928B2}$$

(12) United States Patent
Greaves et al.

(10) Patent No.: US 10,160,928 B2
(45) Date of Patent: Dec. 25, 2018

(54) DEMULSIFIERS FOR OIL SOLUBLE POLYALKYLENE GLYCOL LUBRICANTS

(71) Applicant: Dow Global Technologies LLC, Midland, MI (US)

(72) Inventors: Martin R. Greaves, Baar (CH); Evelyn A. Zaugg-Hoozemans, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/031,299

(22) PCT Filed: Oct. 29, 2014

(86) PCT No.: PCT/US2014/062807
§ 371 (c)(1),
(2) Date: Apr. 22, 2016

(87) PCT Pub. No.: WO2015/069509
PCT Pub. Date: May 14, 2015

(65) Prior Publication Data
US 2016/0251592 A1    Sep. 1, 2016

Related U.S. Application Data

(60) Provisional application No. 61/901,051, filed on Nov. 7, 2013.

(51) Int. Cl.
| | | |
|---|---|---|
| *C10M 171/00* | (2006.01) | |
| *C10M 107/34* | (2006.01) | |
| *C10M 145/34* | (2006.01) | |
| *C08L 71/02* | (2006.01) | |
| *C10N 30/04* | (2006.01) | |

(52) U.S. Cl.
CPC ........... *C10M 145/34* (2013.01); *C08L 71/02* (2013.01); *C08G 2650/58* (2013.01); *C08L 2205/02* (2013.01); *C10M 2209/107* (2013.01); *C10N 2030/04* (2013.01); *C10N 2230/04* (2013.01)

(58) Field of Classification Search
CPC ........ C10M 2209/1075; C10M 145/34; C10M 107/34
USPC .......................................................... 508/579
See application file for complete search history.

(56) References Cited

U.S. PATENT DOCUMENTS

| | | | |
|---|---|---|---|
| 6,458,750 B1 * | 10/2002 | Dardin ................ | C10M 145/36 508/501 |
| 2008/0039537 A1 | 2/2008 | Holt | |
| 2013/0244917 A1 * | 9/2013 | Obrecht .............. | C10M 169/04 508/444 |

FOREIGN PATENT DOCUMENTS

| | | |
|---|---|---|
| WO | 2011/011656 | 1/2011 |
| WO | 2012/030537 | 3/2012 |
| WO | 2013/066702 | 5/2013 |

OTHER PUBLICATIONS

International Search Report & Written Opinion for related PCT Application PCT/US2014/062807, dated Feb. 16, 2015 (10 pgs).
International Preliminary Report on Patentability for related PCT Application PCT/US2014/062807, dated May 19, 2016 (6 pgs).
Greaves, et al., "Performance Properties of Oil-Soluble Synthetic Polyalkylene Glycols"; Lubrication Science, vol. 24, No. 6, Oct. 15, 2012, pp. 251-262 (12 pgs).

* cited by examiner

*Primary Examiner* — Prem C Singh
*Assistant Examiner* — Francis C Campanell
(74) *Attorney, Agent, or Firm* — Brooks, Cameron & Huebsch, PLLC

(57) ABSTRACT

A composition contains a propylene oxide/butylene oxide copolymer with an ethylene oxide/propylene oxide copolymer where the propylene oxide/butylene oxide copolymer has a concentration of propylene oxide moieties in a range of 25-75 wt % based on total of propylene oxide and butylene oxide moieties, the ethylene oxide/propylene oxide copolymer has a concentration of ethylene oxide moieties that is greater than zero and up to 60 wt % based on the total weight of ethylene oxide and propylene oxide moieties, and wherein the concentration of the ethylene oxide/propylene oxide copolymer is greater than zero and one wt % or less based on the total weight of propylene oxide/butylene oxide and ethylene oxide/propylene oxide copolymers and the ethylene oxide/propylene oxide copolymer is a reverse copolymer or a random copolymer.

9 Claims, No Drawings

DEMULSIFIERS FOR OIL SOLUBLE POLYALKYLENE GLYCOL LUBRICANTS

BACKGROUND OF THE INVENTION

Field of the Invention

The present invention relates to lubricant fluids comprising propylene oxide/butylene oxide copolymers.

Introduction

Lubricating fluids (lubricants) are essential components to mechanical devices. Lubricating fluids comprise a base oil with various additives. Lubricants can comprise water or be free of water. Many lubricants, including that of the present invention, are considered anhydrous lubricants because water is an undesirable component and preferably absent from the lubricant. Lubricants are useful as hydraulic fluids, gear oils, turbine fluids and compressor oils. In these applications it is important for the lubricant to reject water that may enter the lubricant because water can lead to corrosion or poor lubrication properties when present in a lubricant. In that regard, it is undesirable for a lubricant, or a base oil in the lubricant, to dissolve water or form a stable emulsion with water. Instead, it is desirable for a lubricant and its base oil to phase separate from water, which allows water to be drained away from the lubricant if it becomes present in the lubricant. There is a test method standard (ASTM D1401) for evaluating water phase separation of petroleum oils and synthetic fluids that is useful for determining whether a lubricant or base oil has sufficient oil separability to serve as a lubricant.

Oil soluble polyalkylene glycols (OSPs) are a new family of synthetic base fluids that can be useful as lubricants or base oils in formulated lubricants. Unlike mineral oil base oils, OSPs have a significant presence of oxygen in the polymer backbone that tends to introduce inherent solvency power and polarity to the OSP molecule. OSPs are designed so as to have a degree of surfactant character, which makes it more difficult for lubricants containing the OSPs to reject water. As a result, lubricant formulations containing OSPs are particularly difficult to demulsify. The alkylene oxide backbone makes them unique from mineral oil base oils so standard demulsifying agents are not typically effective with OSPs. OSPs are so new to the lubricant industry that suitable demulsifiers are yet unknown for them.

There are two types of OSPs available on the market: butylene oxide (BO) homopolymers and propylene oxide and butylene oxide copolymers (PO/BO copolymer). BO homopolymers have excellent water separation properties. However, PO/BO copolymers have less favorable water separation properties. It is desirable to identify a demulsifying agent that, when added to PO/BO copolymers, allows the PO/BO copolymer to pass the ASTMD1401 water separability test.

BRIEF SUMMARY OF THE INVENTION

The present invention solves the problem of creating a PO/BO copolymer formulation that passes the ASTM D1401 water separability test.

Surprisingly, the present invention is a result of discovering that a copolymer of ethylene oxide (EO) and propylene oxide (PO) that has 60 weight-percent or less EO moieties based on total EO and PO moieties in the EO/PO copolymer serves as an effective demulsifier for PO/BO copolymers having a PO moiety concentration of 25-75 weight-percent of the total PO and BO moieties in the PO/BO copolymer.

In a first aspect, the present invention is a composition comprising a propylene oxide/butylene oxide copolymer in combination with an ethylene oxide/propylene oxide copolymer and further characterized by: (a) the propylene oxide/butylene oxide copolymer having a concentration of propylene oxide moieties in a range of 25 to 75 weight-percent based on total propylene oxide and butylene oxide moieties in the propylene oxide/butylene oxide copolymer; (b) the ethylene oxide/propylene oxide copolymer having a concentration of ethylene oxide moieties that is 60 weight-percent or less and greater than zero weight-percent based on the total weight of ethylene oxide and propylene oxide moieties in the ethylene oxide/propylene oxide copolymer; and (c) the concentration of the ethylene oxide/propylene oxide copolymer being one weight-percent or less and greater than zero weight-percent based on total weight of the propylene oxide/butylene oxide and ethylene oxide/propylene oxide copolymers; where the ethylene oxide/propylene oxide copolymer is a reverse block ethylene oxide/propylene oxide copolymer or a random copolymer.

In a second aspect, the present invention is a method of using the composition of the first aspect, the method comprising introducing the composition to a mechanical device in an area of the mechanical device where elements of the device move with respect to one another.

The composition of the present invention is useful as a lubricant. The method of the present invention is useful for lubricating a mechanical device.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated.

The composition of the present invention comprises a copolymer of propylene oxide (PO) and butylene oxide (BO) in combination with a copolymer of ethylene oxide (EO) and PO.

The copolymer of PO and BO (that is, PO/BO copolymer) is an oil soluble polyalkylene glycol (OSP). The PO/BO copolymer can be a block copolymer or a random copolymer, but is preferably a random copolymer. The concentration of PO in the PO/BO copolymer is desirably 25 weight-percent (wt %) or more, preferably 30 wt % or more and can be 40 wt % or more, 50 wt % or more, 60 wt % or more and even 70 wt % or more. At the same time, it is desirable for the concentration of PO in the PO/BO copolymer to be 75 wt % or less, preferably 70 wt % or less, more preferably 60 wt % or less and can be 50 wt % or less. One desirable PO/BO copolymer has, on average, equal weight amounts of PO and BO moieties, that is, comprises 50 wt % PO and 50 wt % BO. The concentration of PO in the PO/BO copolymer refers to the weight of PO moieties in the PO/BO copolymers relative to the total combined weight of PO and BO moieties. PO moieties refer to that portion of PO that becomes part of the PO/BO copolymer after polymerization.

Likewise, BO moieties refer to that portion of BO that becomes part of the PO/BO copolymer after polymerization.

Examples of suitable PO/BO copolymers include alcohol initiated copolymers. The alcohol initiator can be any alcohol, preferably primary alcohol, having eight carbons or more, preferably ten carbons or more, still more preferably twelve carbons or more and at the same time preferably have 20 carbons or fewer. The number of carbons in the alcohol initiator is evident from the number of carbons in the end group of the PO/BO copolymer. Most desirably, the PO/BO copolymer is a dodecanol initiated PO/BO copolymer resulting in an end group in the PO/BO copolymer having 12 carbons. The number of carbons in the initiator corresponds to the number of carbons in the end group of the copolymer. One desirable group of PO/BO copolymers are dodecanol initiated random copolymers comprising 50 wt % PO and 50 wt % BO. Such copolymers are commercially available under the commercial name of UCON™ OSP-18, UCON™ OSP-32, UCON™ OSP-46, UCON™ OSP-68, UCON™ OSP-150, and UCON™ OSP-220 (UCON™ is a trademark of Union Carbide Corporation). The number in the tradename refers to the kinematic viscosity in centiStokes at 40 degrees Celsius (° C.).

Typically, the PO/BO copolymer has an aniline point that is less than −20° C. when measured using ASTM D611-01. Additionally, or alternatively, the PO/BO copolymer further typically has a viscosity index value that is greater than 120 when measured using ASTM D2270. Additionally, or alternatively to each of these characteristics, the PO/BO copolymer can have a pour point that is less than −30° C. when measured using ASTM D97.

The copolymer of EO and PO (that is, EO/PO copolymer) serves as a demulsifier in the PO/BO copolymer. The EO/PO copolymer is desirably water soluble at 23° C. The EO/PO copolymer can be a block copolymer or a random copolymer. If the EO/PO copolymer is a block copolymer it is desirably a "reverse" block copolymer, which means that it involves polymerizing onto an initiator the EO component and then the PO component. As a result, a reverse block EO/PO copolymer has an end group that originates from the initiator attached to an ethylene oxide moiety (—CH$_2$CH$_2$O—). For instance, if the initiator is a 1-dodecanol (herein, just "dodecanol") the end group would be a 12 carbon alkyl of the alcohol. As another example of a reverse block EO/PO copolymer, a diol such as ethylene glycol can be an initiator and EO polymerized onto two sites of the ethylene glycol followed by PO blocks copolymerized onto the EO chains resulting in two chains of EO/PO block copolymers per molecule. A triol can also be used as an initiator for a reverse block EO/PO copolymer thereby establishing three chains of EO/PO block copolymers per molecule. Desirably, the terminal groups, which are the groups on opposite ends of the EO/PO block of a reverse block copolymer relative to the end groups, are hydroxyl groups.

In general, reverse block copolymer of EO and PO originating from a monol initiator will have the following general structure:

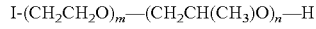

where "m" is the number of moles of EO and "n" is the number of moles of PO reacted onto the block copolymer. "I" is the initiator residue, which corresponds to the initiator less the labile hydroxyl hydrogen and having the bond to EO occurring through an oxygen on the initiator and corresponds to the "end group" of the copolymer. Examples of suitable monol initiators include methanol, butanol, dodecanol and alkyl phenol.

A reverse block copolymer of EO and PO can originate from a polyol initiator such as a diol or triol. Reverse block copolymers of EO and PO onto a polyol initiator have the following general structure:

Where "m" and "n" are on average the number of moles of EO and PO respectively polymerized onto the block copolymer, "p" is the number of labile hydrogens on the initiator (for example, 2 for a diol and 3 for a triol), and "I" is the initiator residue corresponding to the initiator less the labile hydroxy hydrogens where bonds from "I" occur from an oxygen to the EO group and corresponds to the "end group" of the copolymer.

Block copolymers of EO and PO that are not reverse-block copolymers have the order of PO and EO reversed in the resulting block copolymer. That is, PO is bonded to the initiator residue.

Whether the EO/PO copolymer is a reverse block copolymer or a random copolymer, it is desirable for the terminal groups to be hydroxyl groups. The terminal groups are on the opposite end of the copolymer from the initiator.

The concentration of EO in the EO/PO copolymer is greater than zero wt %, preferably 10 wt % or more, more preferably 20 wt % or more, even more preferably 30 wt % or more, yet more preferably 40 wt % or more, and still more preferably 50 wt % or more. At the same time, it is desirable for the concentration of EO in the EO/PO copolymer to be 70 wt % or less, preferably 60 wt % or less. The concentration of EO in the EO/PO copolymer refers to the weight of EO moieties in the EO/PO copolymers relative to the total combined weight of EO and PO moeities. EO moieties refer to that portion of EO that becomes part of the EO/PO copolymer after polymerization. A particularly desirable EO/PO copolymer is 60 wt % EO. While the EO/PO copolymers described in this paragraph can be either block copolymers or random copolymers it is desirable for them to be either random copolymers or reverse block copolymers (that is reverse block EO/PO copolymers), and most preferably for them to be random copolymers. When the concentration of EO exceeds 60 wt % the EO/PO copolymer tends to create a hazy composition with PO/BO copolymer, which is undesirable.

Suitable EO/PO copolymers for use in the present invention include monol, diol and triol initiated copolymers. Examples of suitable diol initiated EO/PO copolymers include: mono-propylene glycol initiated EO/PO random copolymers having 60 wt % EO and a typical kinematic viscosity at 40° C. of 150 square millimeters per second (mm$^2$/s) and an average number molecular weight (Mn) of 1700 grams per mole (g/mol) (for example, SYNALOX™ 40-D100 brand polyol, SYNALOX is a trademark of The Dow Chemical Company), mono-propylene glycol initiated EO/PO random copolymer having 60 wt % EO and a typical kinematic viscosity at 40° C. of 460 mm$^2$/s and an average Mn 3400 g/mol (for example, SYNALOX™ 40-D300 brand polyol) and mono-propylene glycol initiated EO/PO random copolymer having 60 wt % EO and a typical kinematic viscosity at 40° C. of 1000 mm$^2$/s and an average Mn of 5300 g/mol (for example, SYNALOX™ 40-D700 brand polyol). Suitable triol initiated EO/PO copolymers include a triol initiated reverse block copolymers containing 36 wt % EO and having an average Mn of 3500 g/mol, viscosity at 100° C. of 51 centiStokes and specific gravity at 25° C. of 1.040 per ASTM D891. Determine Mn by gas permeation chromatography using a calibration standard of known polyol mixture having a Mn of 1732 g/mol at a concentration of 1.5 wt % in a tetrahydrofuran solvent based on total solution weight. Particularly desirable EO/PO copolymers for use in the present invention include diol initiated EO/PO random copolymers having 50-60 wt % (most preferably 60 wt %) EO and an average Mn in a range of 1700-5300 g/mol and triol initiated EO/PO reverse block copolymers.

The PO/BO copolymer, EO/PO copolymer, or both PO/BO copolymer and EO/PO copolymer can be free of any one or any combination of more than one of the following chemical characteristics: nitrogen, ester, carboxylic acid, carboxylic acid moieties, anhydride, and anhydride moieties.

In the composition of the present invention the concentration of EO/PO copolymer is greater than zero wt %, preferably 0.1 wt % or more, still more preferably 0.2 wt % or more and can be 0.3 wt % or more, 0.4 wt % or more even 0.5 wt % or more based on the combined weight of EO/PO copolymer and PO/BO copolymer. At the same time, the concentration of EO/PO copolymer is typically one wt % or less, preferably 0.8 wt % or less, more preferably 0.6 wt % or less and most preferably 0.5 wt % or less based on the combined weight of EO/PO copolymer and PO/BO copolymer.

The composition of the present invention can contain or be free from components other than the EO/PO copolymer and PO/BO copolymer. In particular, the composition of the present invention can contain or be free from oils other than the EO/PO copolymer and PO/BO copolymer. If the composition contains oils other than the EO/PO copolymer and PO/BO copolymer, the composition will typically contain less than 50 wt % and desirably contains less than 15 wt %, preferably 10 wt % or less of oil other than the EO/PO copolymer and PO/BO copolymer based on total composition weight. "Oil", as used herein, refers to nonionic, non-polar chemical substances that are liquid at 23° C. and 101 kiloPascals pressure.

The composition of the present invention can further comprise any one or any combination of more than one additional component selected from a group consisting of anti-oxidants, corrosion inhibitors, friction modifiers, anti-wear additives, extreme pressure additives and detergents.

The composition of the present invention is useful as a lubricant, such as a lubricant for mechanical devices. One method of using the composition of the present invention involves introducing the composition to a mechanical device in an area of the mechanical device where elements of the device move with respect to one another. The composition of the present invention lubricates the elements of the device thereby reducing wear of the elements as they move with respect to one another.

Examples

Table 1 lists the PO/BO copolymers for use in the following examples. UCON is a trademark of The Dow Chemical Company.

TABLE 1

| PO/BO Copolymer | Description |
| --- | --- |
| UCON ™ OSP-32 | Dodecanol initiated random copolymer (PO/BO, 50/50 by wt) with a typical kinematic viscosity at 40° C. of 32 mm²/s (cSt). Its average Mn |

TABLE 1-continued

| PO/BO Copolymer | Description |
| --- | --- |
| | is 760 g/mol. |
| UCON ™ OSP-46 | Dodecanol initiated random copolymer (PO/BO, 50/50 by wt) with a typical kinematic viscosity at 40° C. of 46 mm²/s (cSt). Its average Mn is 1000 g/mol. |
| UCON ™ OSP-68 | Dodecanol initiated random copolymer (PO/BO, 50/50 by wt) with a typical kinematic viscosity at 40° C. of 68 mm²/s (cSt). Its average Mn is 1400 g/mol. |
| UCON ™ OSP-220 | Dodecanol initiated random copolymer (PO/BO, 50/50 by wt) with a typical kinematic viscosity at 40° C. of 220 mm²/s (cSt). Its average Mn is 2400 g/mol. |

Table 2 lists the EO/PO copolymers for use in the following examples. SYNALOX is a trademark of The Dow Chemical Company.

TABLE 2

| EO/PO Copolymer | Description |
| --- | --- |
| SYNALOX 40-D100 | Diol (mono-propylene glycol) initiated EO/PO random copolymer in which the EO/PO ratio is 60/40 by weight and having a typical kinematic viscosity at 40° C. of 150 mm²/s and average Mn 1700 g/mol. |
| SYNALOX 40-D300 | Diol initiated (mono-propylene glycol) EO/PO random copolymer in which the EO/PO ratio is 60/40 by weight and having a typical kinematic viscosity at 40° C. of 460 mm²/s and average Mn 3400 g/mol. |
| SYNALOX 40-D700 | Diol initiated (mono-propylene glycol) EO/PO random copolymer in which the EO/PO ratio is 60/40 by weight and having a typical kinematic viscosity at 40° C. of 1000 mm²/s and average Mn 5300 g/mol. |
| Experimental Polymer (Ex Pol) 1 | Triol initiated block copolymer (EO/PO) with and EO content of 36 wt %. |
| Ex Pol 2 | Diol initiated block copolymer (EO/PO) with and EO content of 10 wt %. |
| Ex Pol 3 | Diol initiated block copolymer (EO/PO) with and EO content of 30 wt %. |
| Ex Pol 4 | Diol initiated block copolymer (EO/PO) with and EO content of 13 wt %. |
| Ex Pol 5 | Diol initiated block copolymer (EO/PO) with and EO content of 47 wt %. |
| Polyglycol P-400 | A polypropylene glycol having an average Mn of 400 g/mol, an open cup flash point above 150° C. per ASTM D92, a viscosity at 40° C. of 30 centistokes per ASTM D445/D446, a viscosity at 100° C. of 4.7 centistokes per ASTM D445/D446 and a pour point of −37° C. per ASTM D97 and having CAS#25322-69-4, available from Dow Chemical |
| Tergitol ™ 15-S-9 (Tergitol is a trademark of Union Carbide Corporation) | Secondary fatty alcohol ethoxylate with a pour point of 9° C. per ASTM D97, Kinematic viscosity at 25° C. = 60 centipoise per ASTM D445/D446, density at 20° C. = 1.006 g/ml. |

Preparation of Ex Pol 1

To a reactor purged with nitrogen, an amount of Initiator 1 (775 grams (g), is added to a reactor vessel (Initiator 1 is a ethoxylated derivative of glycerol with a Mn=625). An aqueous solution of potassium hydroxide (KOH, 25 g, 45 wt %) is then added and the temperature raised to 115° C. and the excess water removed under vacuum at a pressure of about 30 millibar (mbar) until the water level is less than (<) 2500 parts per million by weight relative to total composition (ppm). The reaction vessel is heated to 135° C. and EO (1121 g) is added. Once the feeding step is completed the reaction is allowed to digest for a period of 60 minutes (min)

at 135° C. To the product is fed at 125° C. a further addition of PO (3103 g,) and the mixture allowed to digest for a period of 260 min at 135° C. After this time the product is removed from the reactor and filtered through a magnesium silicate filter bed to remove catalyst. The appearance of the polyglycol is a clear translucent fluid. The polymer has an EO content of 36 wt % based on the total weight of EO and PO moieties in the polymer, including EO of the initiator.

Preparation of Ex Pol 2

To a reactor purged with nitrogen, an amount of Polyglycol P-400 (1031 g), available from The Dow Chemical Company, is added to a reactor vessel An aqueous solution of potassium hydroxide (KOH, 23 g 45 wt %) is then added and the temperature raised to 115° C. and the excess water removed under vacuum at a pressure of about 30 mbar until the water level is <2000 ppm. The reaction vessel is heated to 125° C. and PO (3469 g) is added. Once the feeding step is completed the reaction is allowed to digest for a period of 120 minutes (min) at 135° C. To the product is fed EO (500 g,) and the mixture allowed to digest for a period of 90 min at 135° C. After this time the product is allowed to cool to less than 40° C. and a 70 wt % aqueous solution of acetic acid (17 g) is added. The appearance of the polyglycol is a clear translucent fluid. The polymer has an EO content of 10 wt % based on total weight of EO and PO moieties in the polymer, including PO in the Polyglycol P-400 initiator.

Preparation of Ex Pol 3

To a reactor purged with nitrogen, an amount of Polyglycol P-400 (available from Dow Chemical) (823 g) is added to a reactor vessel An aqueous solution of potassium hydroxide (KOH, 23 g, 45 wt %) is then added and the temperature raised to 115° C. and the excess water removed under vacuum at a pressure of about 30 mbar until the water level is <2000 ppm. The reaction vessel is heated to 125° C. and PO (3469 g) is added. Once the feeding step is completed the reaction is allowed to digest for a period of 120 minutes (min) at 135° C. To the product is fed EO (1500 g,) at 135° C. and the mixture allowed to digest for a period of 45 min at 140° C. After this time the product is allowed to cool to less than 40° C. and a 70 wt % aqueous solution of acetic acid (17 g) is added. The appearance of the polyglycol is a clear translucent fluid. The polymer has an EO content of 30 wt % based on total weight of EO and PO moieties in the polymer, including PO in the Polyglycol P-400 initiator.

Preparation of Ex Pol 4

To a reactor purged with nitrogen, an amount of Polyglycol P-400 (available from Dow Chemical) (658 g) is added to a reactor vessel An aqueous solution of potassium hydroxide (KOH, 23 g, 45 wt %) is then added and the temperature raised to 115° C. and the excess water removed under vacuum at a pressure of about 30 mbar until the water level is <2000 ppm. The reaction vessel is heated to 125° C. and PO (3708 g) is added. Once the feeding step is completed the reaction is allowed to digest for a period of 120 minutes (min) at 135° C. To the product is fed EO (633 g,) at 135° C. and the mixture allowed to digest for a period of 45 min at 135° C. After this time the product is removed from the reactor and filtered through a magnesium silicate filter bed to remove catalyst The appearance of the polyglycol is a clear translucent fluid. The polymer has an EO content of 13 wt % based on total weight of EO and PO moieties in the polymer, including PO in the Polyglycol P-400 initiator.

Preparation of Ex Pol 5

To a reactor purged with nitrogen, an amount of Polyglycol P-400 (available from Dow Chemical) (308 g) is added to a reactor vessel An aqueous solution of potassium hydroxide (KOH, 21 g, 45 wt %) is then added and the temperature raised to 115° C. and the excess water removed under vacuum at a pressure of about 30 mbar until the water level is <2000 ppm. The reaction vessel is heated to 137° C. and PO (2317 g) is added. Once the feeding step is completed the reaction is allowed to digest for a period of 120 minutes (min) at 137° C. To the product is fed EO (2375 g,) at 137° C. and the mixture allowed to digest for a period of 35 min at 137° C. After this time the product is allowed to cool to less than 40° C. and a 70 wt % aqueous solution of acetic acid (14 g) is added. The appearance of the polyglycol is a clear translucent fluid. The polymer has an EO content of 47 wt % based on total weight of EO and PO moieties in the polymer, including the PO originating from the Polyglycol P-400 initiator.

The following examples are compositions comprising a blend of PO/BO copolymer and EO/PO copolymer and are evaluated for whether they form emulsions with water according to a Demulsifying Test Method of ASTM D1401. Compositions that pass the Demulsifying Test Method are examples of the present invention (Examples, or "Exs") while compositions that do not pass the Demulsifying Test Method are not examples of the present invention (Comparative Examples, or "Comp Exs").

The Demulsifying Test Method

The Demulsifying Test Method provides a guide for determining the water separation characteristics of oils subject to water contamination. The test method measures the ability of petroleum oils or synthetic fluids to separate from water. The method measures water separation at 54° C. for oils having a viscosity up to 90 square millimeters per second ($mm^2$/s or cSt) at 40° C. The test temperature is raised to 82±1° C. when testing products more viscous than 90 $mm^2$/s (cSt) at 40° C. Therefore in this work all fluids having a viscosity above 90 $mm^2$/s at 40° C. are examined at 82° C.

Blend equal portions of water and oil (40 ml of each) together at a set temperature in a 150 ml graduated cylinder (either 54° C. or 82° C.) for 5 minutes at a fixed rate. Cease stirring and allow the mixture to separate. Record the volume of oil, water and emulsion after 30 minutes (the ASTM D1401 also allows reporting of measurements at other time intervals. For these examples make measurements after 30 minutes). For these experiments "oil" refers to the composition comprising a blend of PO/BO copolymer and EO/PO copolymer.

Report results in the format: milliliter (mL) of oil/mL of water/mL of emulsion after the 30 minute separation period.

A fluid that demonstrates excellent demulsibility (and the optimum possible) will yield a result of 40/40/0. This shows there is complete separation of the water from the oil and no emulsion is formed.

Sometimes an emulsion will form. When this occurs then fluids that show values of 3 mL or less of emulsion are considered to be excellent fluids. Therefore, as examples, fluids with a demulsibility result of 39/38/3 or 40/38/2 are considered to be excellent results.

Some fluids separate slowly and do not show an emulsion. They appear as two layers in which the oil layer has a heavy entrainment of air. In these experiments if the difference in the first number and the second number is greater than 10 then the demulsibility is described as being poor and it is rated a "Fail". If the difference in the first number and the second number is less than 10, then the demulsibility is described as being good and it is rated a "Pass". Therefore for example a result of 44/36/0 is considered to be a "PASS" but a result of 46/34/0 is considered to be a "FAIL". Fluids that do not show any separation receive a rating of 0/0/80.

Screening PO/EO Copolymer Effects at 0.5 Weight-Percent Loading

Screen a series of different EO/PO copolymers blended into a PO/BO copolymer (UCON OSP-68) at a concentration of 0.5 wt % of combined EO/PO copolymer and PO/BO copolymer weight. Subject the different compositions to The Demulsifying Test Method.

Results are in Table 3.

TABLE 3

| Sample | EO/PO Copolymer | Result | Pass or Fail |
|---|---|---|---|
| Reference | | | |
| Comp Ex A | (none) | 15/36/29 | F |
| EO/PO - Diol Initiated Block Copolymer | | | |
| Comp Ex B | Ex Pol 2 | 55/25/0 | F |
| Comp Ex C | Ex Pol 3 | 0/0/80 | F |
| Comp Ex D | Ex Pol 4 | 70/10/0 | F |
| Comp Ex E | Ex Pol 5 | 0/0/80 | F |
| EO/PO - Trial Initiated Reverse Block Copolymer | | | |
| Ex 1 | Ex Pol 1 | 45/35/0 | P |
| EO/PO - Diol Initiated PO Homo-Polymer | | | |
| Comp Ex F | Polyglycol P-400 | 30/37/13 | F |
| EO/PO - Alcohol Ethoxylate(monol) Initiated | | | |
| Comp Ex G | Tergitol 15-S-9 | 0/15/65 | F |
| EO/PO - Diol Initiated Random Copolymer | | | |
| Ex 2 | SYNALOX 40-D300 | 40/40/0 | P |

The data in Table 3 reveals that EO/PO random copolymer and EO/PO reverse block copolymer significantly improve demulsibility of the PO/BO copolymer.

BO/PO Copolymer Viscosity/Molecular Weight Screening

Prepare oils by blending PO/BO copolymers of different Mn and viscosity with three different EO/PO copolymers at an EO/PO copolymer loading of 0.25 wt % based on combined EO/PO copolymer and PO/BO copolymer weight. Subject the oils to The Demulsifying Test Method. Formulations and results are in Table 4.

TABLE 4

| Sample | PO/BO Copolymer | EO/PO Copolymer | Result | Pass or Fail |
|---|---|---|---|---|
| References | | | | |
| Comp Ex H | UCON OSP-32 | (none) | 52/28/0 | F |
| Comp Ex I | UCON OSP-46 | (none) | 45/35/0 | P |
| Comp Ex A | UCON OSP-68 | (none) | 15/36/29 | F |
| Comp Ex J | UCON OSP-220 | (none) | 47/33/0 | F |
| UCON OSP-32 PO/BO Copolymer Blends | | | | |
| Ex 3 | UCON OSP-32 | SYNALOX 40-D100 | 45/35/0 | P |
| Ex 4 | UCON OSP-32 | SYNALOX 40-D300 | 45/35/0 | P |
| Comp Ex K | UCON OSP-32 | Ex Pol 1 | 0/0/80 | F |
| UCON OSP-46 PO/BO Copolymer Blends | | | | |
| Ex 5 | UCON OSP-46 | SYNALOX 40-D100 | 43/37/0 | P |
| Ex 6 | UCON OSP-46 | SYNALOX 40-D300 | 41/39/0 | P |
| Ex 7 | UCON OSP-46 | Ex Pol 1 | 43/37/0 | P |
| UCON OSP-68 PO/BO Copolymer Blends | | | | |
| Ex 8 | UCON OSP-68 | SYNALOX 40-D100 | 41/39/0 | P |
| Ex 9 | UCON OSP-68 | SYNALOX 40-D300 | 43/37/0 | P |
| Comp Ex L | UCON OSP-68 | Ex Pol 1 | 47/33/0 | F |
| UCON OSP-220 PO/BO Copolymer Blends | | | | |
| Ex 10 | UCON OSP-220 | SYNALOX 40-D100 | 44/36/0 | P |
| Comp Ex M | UCON OSP-220 | SYNALOX 40-D300 | 47/33/0 | F |
| Ex 11 | UCON OSP-220 | Ex Pol 1 | 45/35/0 | P |

The data of Table 4 reveals that the successful demulsifying EO/PO copolymers from Table 3 also work at concentration of 0.25 wt % and with PO/BO copolymers of a broad range of viscosity and Mn.

SYNALOX 40-D in UCON OSP-68

Prepare composition of SYNALOX 40-D at various concentrations in UCON OSP-68 and test the formulations in The Demulsifying Test Method. Formulations and results are in Table 5.

TABLE 5

| Sample | EO/PO Copolymer | EO/PO Copolymer Concentration (wt %) | Result | Pass or Fail |
|---|---|---|---|---|
| References | | | | |
| Comp Ex A | (none) | (none) | 15/36/29 | F |
| SYNALOX 40-D100 | | | | |
| Ex 12 | SYNALOX 40-D100 | 0.1 | 41/39/0 | P |
| Ex 13 | SYNALOX 40-D100 | 0.25 | 43/37/0 | P |
| Ex 14 | SYNALOX 40-D100 | 0.5 | 42/38/0 | P |
| SYNALOX 40-D300 | | | | |
| Ex 15 | SYNALOX 40-D300 | 0.1 | 44/36/0 | P |
| Ex 16 | SYNALOX 40-D300 | 0.25 | 42/38/0 | P |
| Ex 17 | SYNALOX 40-D300 | 0.5 | 41/39/0 | P |
| SYNALOX 40-D700 | | | | |
| Ex 18 | SYNALOX 40-D700 | 0.1 | 44/36/0 | P |
| Ex 19 | SYNALOX 40-D700 | 0.25 | 42/38/0 | P |
| Ex 20 | SYNALOX 40-D700 | 0.5 | 41/39/0 | P |

The data of Table 5 reveals EO/PO random copolymers over a range of Mn and viscosities are effective demulsifiers over a broad range of concentrations for PO/BO copolymers.

SYNALOX 40-D or Ex Pol 1 in UCON OSP-220

Prepare composition of SYNALOX 40-D or Ex Pol 1 at various concentrations in UCON OSP-220 and test the formulations in The Demulsifying Test Method. Formulations and results are in Table 6.

TABLE 6

| Sample | EO/PO Copolymer | EO/PO Copolymer Concentration (wt %) | Result | Pass or Fail |
|---|---|---|---|---|
| References | | | | |
| Comp Ex J | UCON OSP-220 | (none) | 47/33/0 | F |
| SYNALOX 40-D100 | | | | |
| Ex 21 | SYNALOX 40-D100 | 0.1 | 45/35/0 | P |
| Ex 22 | SYNALOX 40-D100 | 0.25 | 44/36/0 | P |
| Ex 23 | SYNALOX 40-D100 | 0.5 | 45/35/0 | P |
| SYNALOX 40-D300 | | | | |
| Comp Ex N | SYNALOX 40-D300 | 0.1 | 50/30/0 | F |
| Comp Ex O | SYNALOX 40-D300 | 0.25 | 50/30/0 | F |
| Ex 26 | SYNALOX 40-D300 | 0.5 | 45/35/0 | P |
| SYNALOX 40-D700 | | | | |
| Comp Ex P | SYNALOX 40-D700 | 0.1 | 70/30/0 | F |
| Ex 28 | SYNALOX 40-D700 | 0.25 | 45/35/0 | P |
| Ex 29 | SYNALOX 40-D700 | 0.5 | 45/35/0 | P |
| Ex Pol 1 | | | | |
| Ex 30 | Ex Pol 1 | 0.5 | 42/38/0 | P |

The data of Table 6 reveals EO/PO random copolymers and reverse block copolymer over a range of Mn and viscosities are effective demulsifiers over a broad range of concentrations for PO/BO copolymers.

The invention claimed is:

1. A composition having improved demulsibility, the composition comprising a propylene oxide/butylene oxide copolymer in combination with an ethylene oxide/propylene oxide copolymer and further characterized by:
   a. the propylene oxide/butylene oxide copolymer having a concentration of propylene oxide moieties in a range of 25 to 75 weight-percent based on total propylene oxide and butylene oxide moieties in the propylene oxide/butylene oxide copolymer;
   b. the ethylene oxide/propylene oxide copolymer having a concentration of ethylene oxide moieties that is 60 weight-percent or less and greater than zero weight-percent based on the total weight of ethylene oxide and propylene oxide moieties in the ethylene oxide/propylene oxide copolymer; and
   c. the concentration of the ethylene oxide/propylene oxide copolymer being one weight-percent or less and greater than zero weight-percent based on total weight of the propylene oxide/butylene oxide and ethylene oxide/propylene oxide copolymers;
   where the ethylene oxide/propylene oxide copolymer is a reverse block ethylene oxide/propylene oxide copolymer or a random copolymer; and
   where the composition exhibits improved demulsibility as evidenced by a difference between a value of a first number and a value of a second number being less than 10 in accordance with ASTM D1401.

2. The composition of claim 1, further characterized by the propylene oxide/butylene oxide copolymer having an end group that contains 8-20 carbon atoms.

3. The composition of claim 2, further characterized by the end group being an alkyl.

4. The composition of claim 3, further characterized by the end group being dodecyl.

5. The composition of claim 1, further characterized by the propylene oxide/butylene oxide copolymer being a random copolymer.

6. The composition of claim 1, further characterized by the propylene oxide/butylene oxide copolymer having, on average, equal weight amounts of propylene oxide moieties as butylene oxide moieties.

7. The composition of claim 1, further characterized by containing less than 50 wt % of an oil other than the propylene oxide/butylene oxide copolymer and ethylene oxide/propylene oxide copolymer based on total composition weight.

8. The composition of claim 1, further characterized by the propylene oxide/butylene oxide copolymer and ethylene oxide/propylene oxide copolymer being free of nitrogen moieties, ester moieties, acid moieties, and anhydride moieties.

9. A method of using the composition of claim 1, the method comprising introducing the composition to a mechanical device in an area of the mechanical device where elements of the device move with respect to one another.

* * * * *